Patented Nov. 10, 1925.

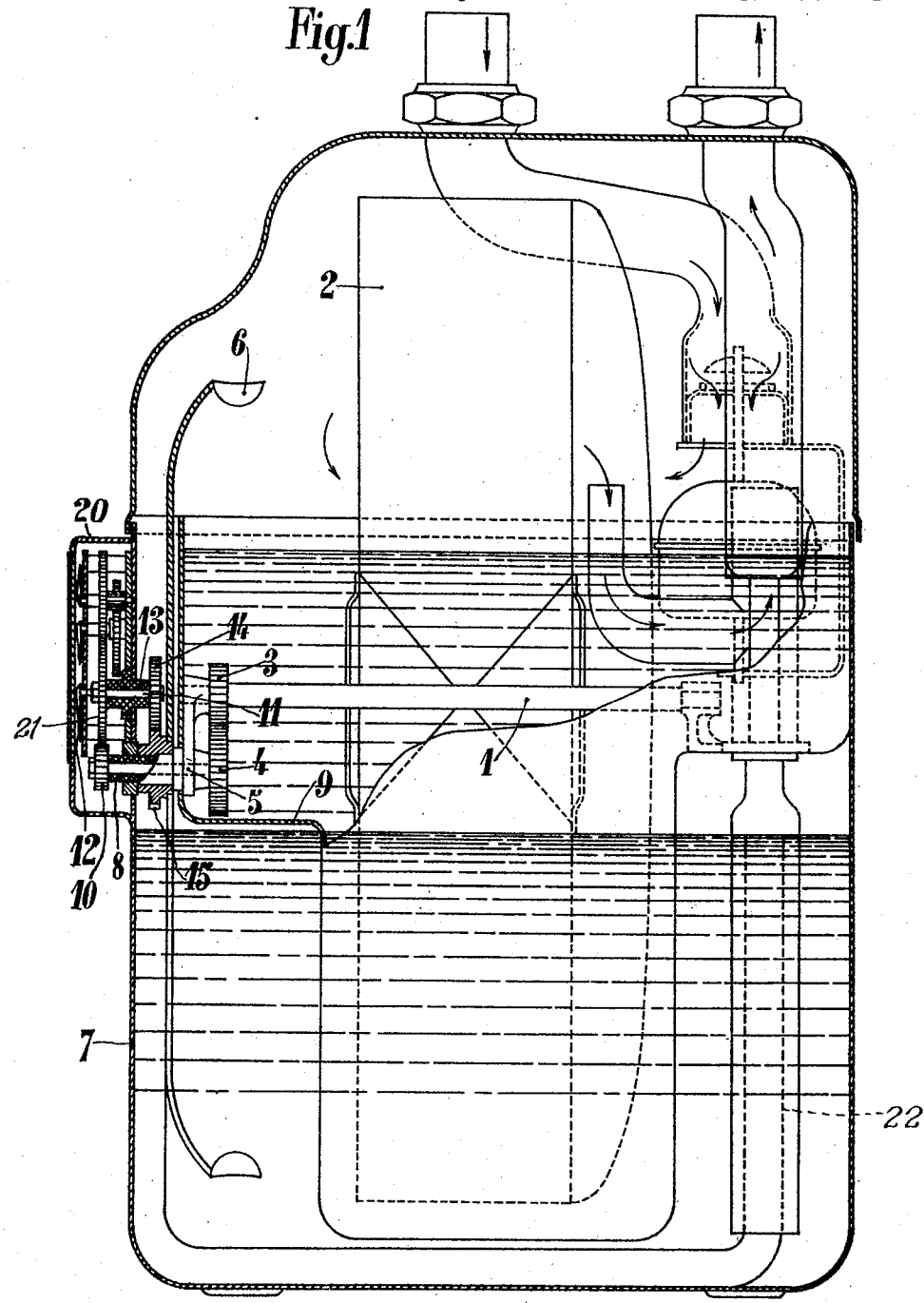

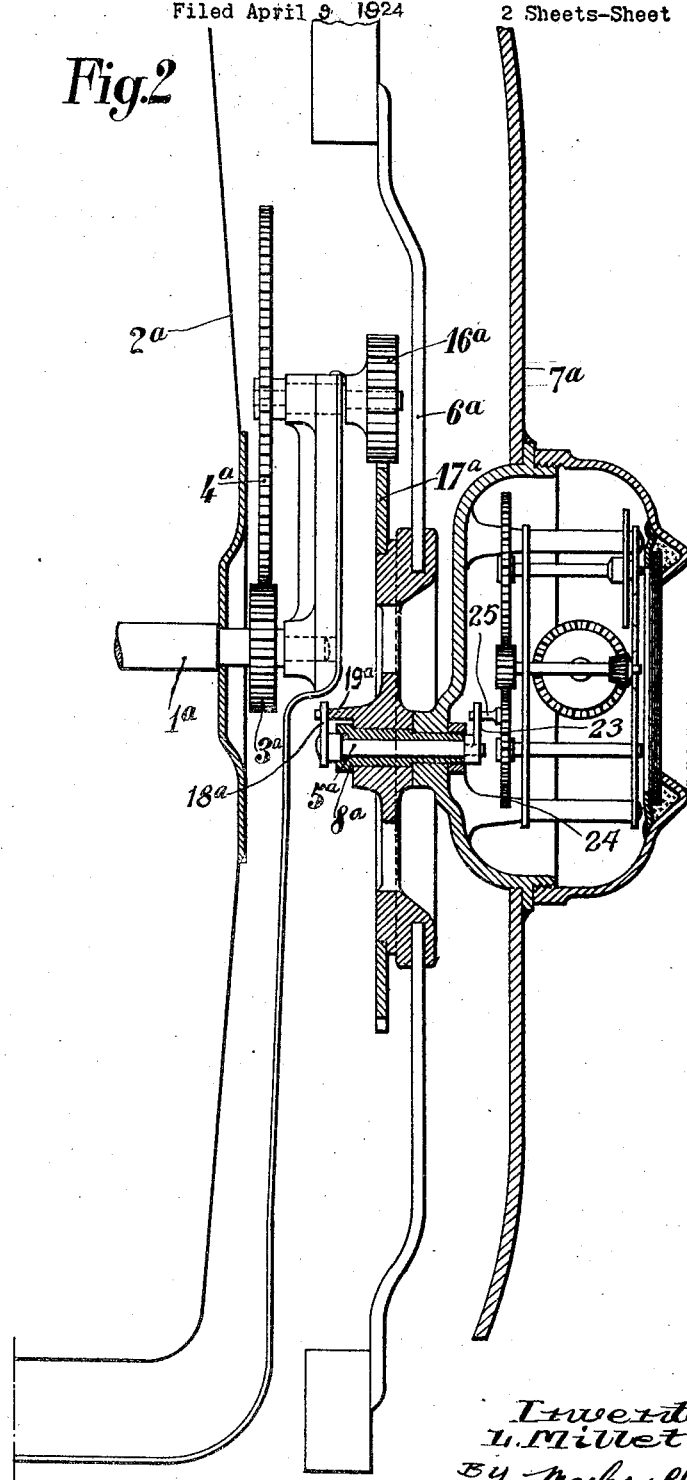

1,561,099

UNITED STATES PATENT OFFICE.

LAURENT MILLET, OF MONTROUGE/SEINE, FRANCE, ASSIGNOR TO COMPAGNIE POUR LA FABRICATION DES COMPTEURS ET MATERIEL D'USINES À GAZ, OF MONTROUGE, FRANCE, A FRENCH COMPANY.

MECHANISM OF GAS METERS.

Application filed April 9, 1924. Serial No. 705,386.

*To all whom it may concern:*

Be it known that I, LAURENT MILLET, a citizen of the French Republic, residing at 12 Place des Etats-Unis, Montrouge, Seine, France, have invented new and useful Improvements in the Mechanisms of Gas Meters, of which the following is a specification.

The present invention relates to improvements in gas meters of the liquid type, these improvements being adapted to render more simple and less costly the manufacture of these apparatus.

For permitting a clear explanation of the subject-matter of the invention, two forms of carrying out the said invention are described hereafter by way of example with reference to the accompanying drawing in which:

Fig. 1 is a sectional elevation of the first form of construction.

Fig. 2 is a partial sectional elevation of the second form of construction.

A gas meter of the liquid type is composed of two essential parts: a first part constituted by a measuring drum 2 mounted on a rotatable shaft 1 and combined with a water vessel 9 in which the drum 2 dips. Means are also provided for causing this drum to rotate in such manner that the number of revolutions of the said drum is proportional to the volume of gas that has passed through the meter. The invention does not refer in any way to this portion of the meter, which can be of any type already well known. It is not therefore necessary to give a detailed description of this portion of the apparatus. The second part is composed of an indicating mechanism, means for connecting this mechanism to the shaft 1 of the drum 2, an elevating apparatus 6, and means for actuating this elevating apparatus. The invention refers to this portion which, consequently, is described in detail hereafter.

In the example illustrated in Fig. 1, a toothed wheel 3 is rigidly secured on the shaft 1 and this wheel 3 gears with another wheel 4 rigidly secured on a shaft 5 supported by a bearing 8 passing through the wall of the vessel 9 and the outer casing 7. The bearing 8 is secured on the vessel 9 and casing 7 in a fluid-tight manner, for instance by soldering.

The shaft 5 extends into the gear case 20 which encloses the indicating mechanism. On this shaft 5 is rigidly secured the first wheel 10 of this mechanism. The wheel 10 gears with another wheel 21 rigidly secured on a shaft 11 carrying a pointer 12 which moves in the known manner over a dial. The wheel 21 drives other wheels actuating other indicators, in the usual manner in gas meters.

The shaft 11 is supported by a bearing 13, passing through the casing 7 and secured in the same in a fluid-tight manner. The said shaft 11 carries a fixed wheel 14 gearing with a wheel 15. This wheel rotates on the outer surface of the bearing 8. On the wheel 15 is secured the elevating apparatus 6.

When the shaft 1 rotates, the movement of the wheel 3 is transmitted to the shaft 5 by the wheel 4. The wheel 10 causes the wheel 21 and, consequently, the shaft 11 and all the indicator shafts to rotate. The rotation of the shaft 11 is transmitted by the wheel 14 to the wheel 15, so that the elevating apparatus 6 rotates, draws water from the casing 7, in the usual manner in the meters of the liquid type, and pours this water into the vessel 9. This vessel overflows back into the casing 7, as usual, through the tube 22, so that the level of the water is maintained constant in the vessel 9, this, as is known, being necessary for the precision of the measurement.

The shaft 5 transmits only rotary motion and bears only very small static loads. The same is true for the shaft 11. The shafts 5 and 11 being subjected only to very small stresses. Practice shows that, in this case, no fluid-tight packing is any longer necessary for preventing water or gas from passing along these shafts. The elimination of the said packings considerably simplifies the construction of the apparatus and renders it less expensive.

In the example shown in Fig. 2, a single shaft only passes through the wall of the vessel $7^a$, instead of two.

To permit this, the shaft $1^a$ of the drum $2^a$ actuates, by means of the gear train $3^a$, $4^a$ and $16^a$, the wheel $17^a$ to which is secured the elevating apparatus $6^a$. This apparatus rotates on the exterior of the bearing $8^a$, through which passes the shaft $5^a$ controlling the registering mechanism. This shaft carries an arm 18ª actuated by a tappet 19ª integral with the elevating apparatus 6ª. The shaft 5ª controls the toothed wheel 24 by means of a finger 23 abutting against a tappet 25 secured on the wheel 24. The latter actuates as usual the indicating mechanism.

As in the from shown in Fig. 1, the shaft 5ª bears only very reduced stresses, since the elevating apparatus is supported by the bearing 8ª. This shaft can therefore be of small diameter, and no fluid-tight packings are necessary.

What I claim and desire to secure by Letters Patent is:

In a gas meter of the liquid type, a casing, a rotary measuring drum in the same, a bearing passing through the casing and secured to said casing in a fluid-tight manner, a shaft mounted in this bearing, means for transmitting rotary motion of the measuring drum to said shaft, an indicating mechanism arranged exteriorly of the casing, means for transmitting rotary motion of the shaft to the indicating mechanism, an elevating apparatus journalled on the bearing within the casing, and means for transmitting rotary motion of the measuring drum to the said elevating apparatus.

In testimony whereof I have signed my name to this specification.

LAURENT MILLET.